April 30, 1940.  C. H. BARR  2,198,752
PRESERVATION OF BIOLOGICALLY ACTIVE AND OTHER SUBSTANCES
Filed July 10, 1936  3 Sheets-Sheet 2
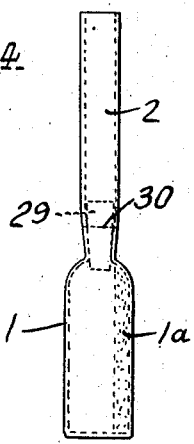
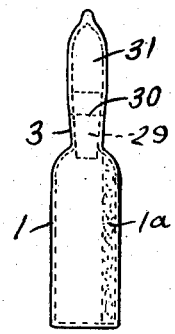
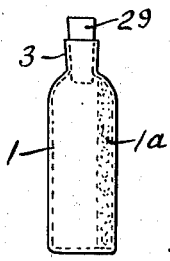
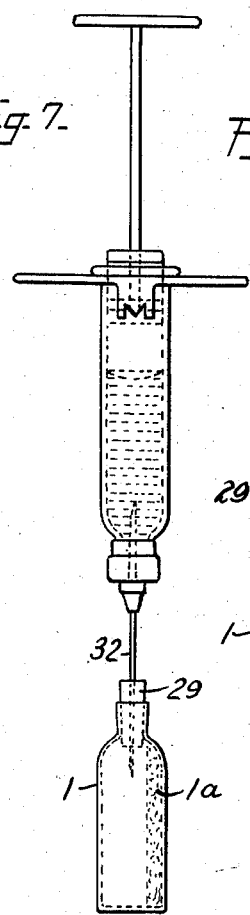
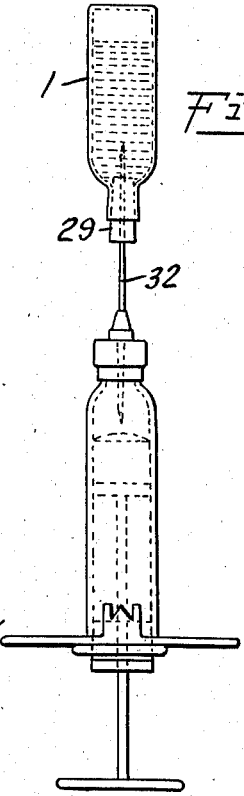
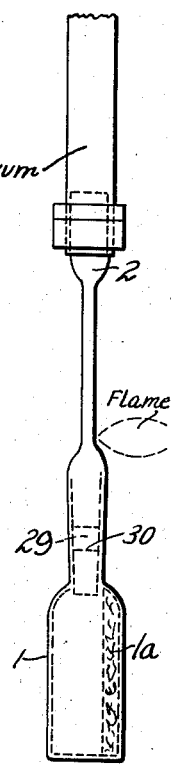
INVENTOR
Courtland H. Barr
BY
Pennie Davis Marvin & Edmonds
ATTORNEYS

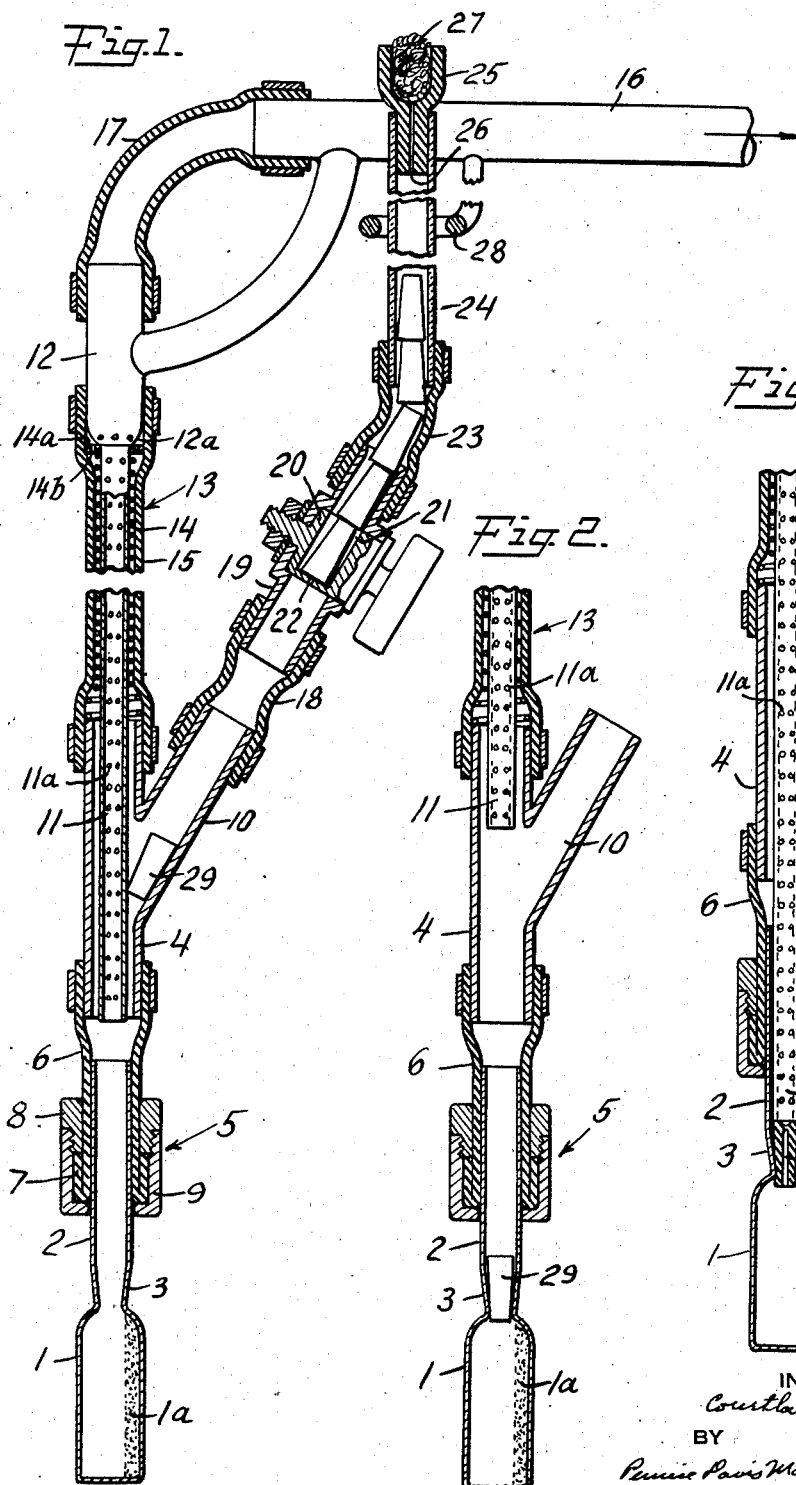

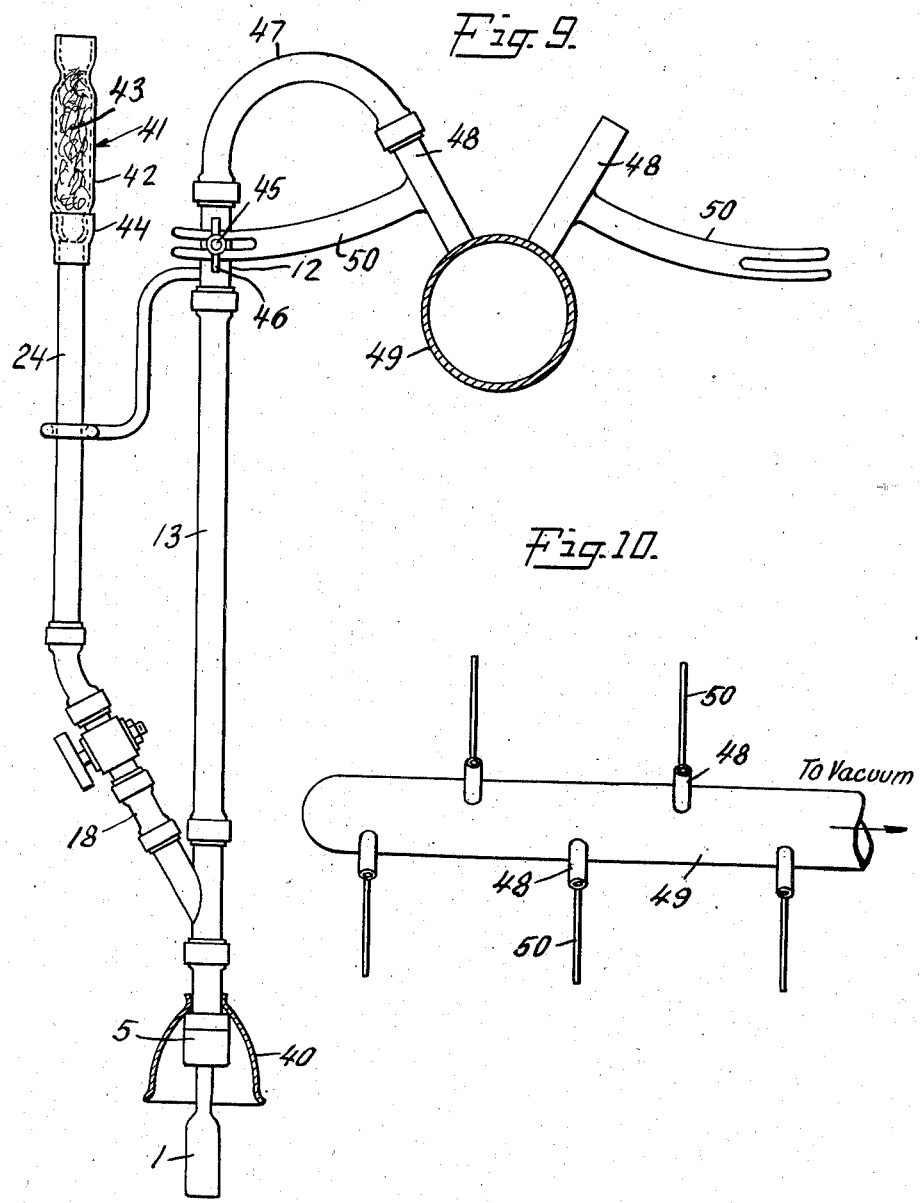

Patented Apr. 30, 1940

2,198,752

UNITED STATES PATENT OFFICE 2,198,752

PRESERVATION OF BIOLOGICALLY ACTIVE AND OTHER SUBSTANCES

Courtland H. Barr, Glenolden, Pa., assignor to Sharp & Dohme, Incorporated, Philadelphia, Pa., a corporation of Maryland (1929)

Application July 10, 1936, Serial No. 90,033

11 Claims. (Cl. 226—82)

The present invention relates to improvements in the preservation of biologically active and other substances, including such substances as sera, protein solutions, bacterial cultures, pharmaceutical and glandular substances, viruses and other labile biological substances; and it relates more particularly to improvements in methods and apparatus for sealing such substances in final containers under a high vacuum after treating such substances by freezing, and dehydration under a high vacuum. The improved final containers containing such desiccated substances, sealed under the original vacuum, and provided with means by which water or other aqueous liquid can be readily introduced into the container without destroying the vacuum, to restore the desiccated substances to a liquid state suitable for use, are claimed in a divisional application Serial No. 283,284, filed July 7, 1939.

Desiccated biologically active substances are very porous, and it is desirable to package and distribute them under a vacuum, both to prevent any deterioration which might be caused by contact with the air, and to facilitate the dissolving of the material in water or other aqueous fluid when restoration is desired. If such material is maintained under a vacuum, and water is introduced into the container before the vacuum is broken, the vacuum tends to pull the water into the pores and interstices of the material, insuring intimate contact of the water with the material and preventing the material from being impregnated with gas which might tend to prevent the ready access of water to the interior portions of the desiccated material. Methods of producing such desiccated biologically active substances, in final containers, sealed under a high vacuum in containers provided with all-glass seals, and perforable closures sealed within the glass have been developed by Dr. Reichel of the Mulforr Laboratories. Such containers enable the distribution and storage of the materials while maintained under a high vacuum, with absolute assurance that the vacuum is maintained and that the material is kept free from contamination, and yet permit water to be introduced without breaking the vacuum, by breaking the glass seal over the perforable closure, and introducing water, by means of a hollow needle through this closure, which serves to hold the vacuum after the glass seal is broken.

It is an object of the present invention to provide an improved process and apparatus by which desiccated biologically active and other substances may be produced and stored in a container sealed with an all-glass seal and with a perforable stopper, such as a rubber stopper, sealed within the glass; and to provide such a container, having a body portion and a single neck, with a perforable stopper sealed within the neck, the material being sealed within the container under the original vacuum, such that there is absolute assurance that the vacuum is maintained during storage, etc., and that the material is kept free from contamination, air, moisture, etc., and such that, when it is desired to restore the material to a liquid state, water or other liquid may be introduced without destroying the vacuum.

In accordance with the present invention, a suitable vial or container of ordinary soft glass, preferably cylindrical in shape, provided with a relatively long tubular neck, the inside of which at the point adjacent the top of the vial or container is tapered to fit a rubber stopper, is provided. The size of the vial may be varied almost at will, its capacity being determined by the amount of material which it is intended to contain and being such as to contain one or more unit portions of the material. Thus the capacity of the container may vary from a fraction of a cubic centimeter to 50 or 100 or more cubic centimeters.

Where the container is intended for the storage and distribution of desiccated biologically active substances, which are to be desiccated in the container, its volume should be somewhat more than twice as great as the volume of the material intended to be processed therein, in order to provide adequate surface for the sublimation or evaporation of water therefrom. Thus if unconcentrated material is processed in the container, the container must have a volume of about twice the volume of the final restored product, whereas if concentrated material, such as material which has been concentrated to about one-half volume in a suitable manner, is processed within the container, the container may have an amount of desiccated material within it which on restoration to its normal liquid condition about fills the container. The neck of the vial, even where tapered, must be of sufficient size to permit the free flow of water vapor during the desiccation process.

In carrying out the desiccation, the material is originally frozen by exposure to a refrigerant maintained at a very low temperature, and is then subjected to the action of a high vacuum, the heat absorbed during the sublimation or vaporization which takes place being sufficient to maintain the material in a frozen state despite the flow of heat into the material from the atmosphere or surroundings. In order to maintain the sublimation or vaporization at a sufficiently rapid rate to prevent the melting of the material, it is necessary to provide an adequately large passageway for the vapors, and to avoid the use of vapor passages of too small a lumen, or with too many constrictions.

Into the container so provided is introduced the proper amount of biologically active substance to be treated, and this substance is then frozen, preferably while the container is in a more or less horizontal position to insure a maximum exposed surface for sublimation, and by exposure to a refrigerant maintained at a very low temperature, e. g. −70° C. The container is then attached to a vacuum manifold and subjected to the action of a high vacuum to remove the water from the frozen material. After the desiccation has proceeded to the desired extent, a rubber stopper is introduced into the neck of the vial and forced down to form a tight joint in the tapered portion of the neck of vial or container. This is done without breaking the vacuum, and as a result, the material is sealed within the container under a high vacuum with a perforable closure.

The glass neck of the vial, which extends considerably above the rubber stopper, is then flame-sealed, either while the vial is still attached to the vacuum manifold, or after removing the vial from the manifold and drawing a portion of the neck to a capillary tube, re-evacuating the neck and flame-sealing the neck at the point where it has been drawn to a fine tube. It is advantageous to draw a portion of the neck at the point of sealing to a fine tube before sealing as this simplifies the sealing operation, and insures the production of a vacuum tight seal, without risk of the glass puncturing, as frequently occurs when tubes of relatively large diameter, made from soft glass, are flame-sealed under a vacuum. After the sealing, or before, the tube or neck of the vial is etched or scratched a little below the top of the rubber stopper, so that it may be readily broken off at this point. The desiccated material so produced is maintained as a formed porous mass, having the shape and volume of the frozen material from which it is produced, without change in its physical structure after desiccation, and having an immense network of capillaries or pores.

When it is desired to use the material within the container, it is merely necessary to break off the neck or tube at the etched or scratched point and introduce water or aqueous fluid into the container by means of a hypodermic needle or similar device which is readily forced through the perforable rubber stopper. The vacuum, which is maintained within the container, during storage by means of the glass seal, and just prior to restoration by means of the rubber stopper, facilitates the introduction of water and insures the complete and speedy dissolving of the material in the water.

To carry out this process, and produce the final container containing the treated material, the invention provides apparatus of suitable construction. In general, the apparatus comprises an attachment or apparatus suitably connected to a vacuum manifold, and provided with means for attaching containers, containing frozen material to be desiccated, to it. The attachment also provides a passageway of relatively large diameter to permit the free flow of vapors from the container to the vacuum manifold. The attachment also includes means by which rubber stoppers may be readily introduced into the neck of the vial after the desiccation is complete, and means by which the stoppers may be forced into proper position to insure the production of a tight seal and the maintenance of a high vacuum within the container even though the neck of the container is open and exposed to atmospheric pressure for relatively short periods of time, as in flame-sealing or in restoring the desiccated material to a liquid state.

The invention will be further illustrated and explained in connection with the drawings, which illustrate an attachment or apparatus which embodies the invention and which illustrate a container suitable for marketing and distribution containing a desiccated biologically active substance which embodies the invention, and which illustrate the means by which water may be introduced into such container to restore the material to a liquid state without breaking the vacuum maintained within the container.

In the drawings,

Fig. 1 is a sectional view of the attachment or apparatus shown in the position used during the desiccation of the frozen material;

Fig. 2 is a sectional view of a portion of the apparatus or attachment showing the means by which a stopper is introduced into the neck of the vial or container;

Fig. 3 is a sectional view of a portion of the apparatus or attachment showing the means by which the rubber stopper is forced into place to form a tight seal;

Figs. 4 and 5 are views showing the final container before and after the glass seal is made;

Figs. 6, 7 and 8 are views showing the container after the glass seal is broken off and when the container is ready for the introduction of water and means by which water may be introduced;

Fig. 9 is a view in perspective, showing the attachment fastened to a vacuum manifold;

Fig. 10 is a view of a portion of a suitable vacuum manifold, showing a suitable arrangement of outlets and means for fastening the attachments thereto; and Fig. 11 is a view showing the final container with a portion of the neck above the stopper drawn to a fine tube; and Fig. 12 is a view showing the sealing of the neck above the stopper while maintaining a vacuum in the neck.

In Fig. 1, 1 represents a vial or container of suitable size intended for the marketing or distribution of a desiccated serum or other biologically active substance, containing a frozen or desiccated biologically active substance 1a, provided with a relative long neck 2 of suitable diameter and with a tapered portion 3 at the top of the vial or container. This vial or container is connected to a metal tube 4 by means of a suitable vacuum-tight connection, as shown at 5. This connection, which has sufficient tolerance to provide for variations in the size of the container necks, includes a soft rubber tube 6 over which is slipped a threaded brass cap 8. A portion of the rubber tube is then turned back on itself as shown at 7, and a brass cap 9 screwed onto the threaded sleeve. The portion of the rubber tube under the cap is thus of double thickness, and the cap limits the expansion of this portion of the tube. When the neck of a container is inserted in the rubber tube, and the vacuum applied, a vacuum-tight seal is quickly formed. The metal tube 4 is provided with a side outlet 10 extending upwardly at an angle.

Within tube 4 is located a hollow plunger 11, which may be provided with a number of openings 11a, through which the vapors or gases from the container 1 flow to the vacuum manifold. This hollow plunger is rigidly connected to metal tube 12, as at 12a. The tube 12 is also connected to tube 4 by means of an extensible tube 13, which consists of an inner spiral or metal spring 4, and an outer or surrounding rubber tube 15, and which is readily lengthened or shortened. A stop 14a, which may have a number of holes 14b, is provided at the bottom of the tube 12 to confine the spring 14.

The plunger 11 is of sufficient length to normally block the opening between the side outlet 10 and sleeve 4. The metal spring or spiral is provided to prevent the rubber tube, which is relatively long and must be extensible, from collapsing under the influence of the vacuum. The connections between tubes 4 and 12 and tube 13 are, of course, vacuum-tight. Tube 12 is connected to the vacuum pump or vacuum manifold by metal tube 16 and the rubber tube 17, which is made of relatively heavy rubber, and which may be clamped to permit the sealing off of the lower part of the apparatus from the vacuum pump or manifold as when disconnecting the vial or container from the attachment, etc. Attached to the side outlet 10 by means of the rubber connection 18, is a metal tube 19, provided with a special valve 20. The rubber connection 18 is used so that the tube 19 and other portions of the apparatus attached thereto may be readily sealed off from the rest of the attachment or apparatus by a vacuum-tight seal. Valve 20, which is included in tube 19, consists of a rotatable metal disc having an opening 21 adapted to receive a rubber stopper suitable for seal for sealing the container or vial from the upper portion of tube 19, and to turn it around and allow it to drop into tube 10. This valve may be provided with a small air hole 22 to prevent the rubber stopper from adhering to the valve when it is turned. Connected to the tube 19 by means of rubber tube 23 is a tube 24, of glass or other material, adapted to hold a number of the rubber stoppers, each upside down. The tube is provided at the top with a stopper 25 having a small air hole 26 and an air filter made of absorbent cotton or similar material 27. Thus when a stopper is removed from this tube by means of the valve 20, this air filter and air hole allow sufficient sterile air to enter the tube to prevent the formation of a vacuum therein which might interfere with feeding the stoppers through the valve. This tube for the stoppers is supported by means of a ring or similar device 28, which is of a construction which will permit the tube to be taken off or replaced at will, and which will permit the tube to move vertically with the lower portion of the attachment and with respect to the upper portion.

An advantageous method of fastening the attachments to a vacuum manifold, and a suitable manifold, are illustrated in Figs. 9 and 10. In Fig. 9 is shown an attachment with a container 1 attached to it, as in Fig. 1, with a bell 40 over the connection 5 and the neck of the container. This bell keeps dust, etc., which falls downwardly from coming into contact with the connection 5, and helps to preserve sterility in the operation. The attachment is provided with a tube 24 for the rubber stoppers, and with a somewhat modified form of air filter 41 on this tube. This air filter includes a glass tube 42, containing absorbent cotton or the like 43, attached to tube 24 by rubber connection 44. The extensible tube 13 is fastened to a metal tube 12, as in Fig. 1, and this tube is provided with a threaded stud or bolt 45 carrying a wing nut 46. A rubber tube 47 is fastened to the other end of tube 12 with a vacuum-tight connection.

This rubber tube fits over an outlet 48 on vacuum manifold 49, which may be provided with 100 or more such outlets (Figs. 9 and 10). Each outlet 48 is provided with a forked support 50, the slot of which fits over the bolt or stud 45, the attachment then being secured in place by the wing nut 46. In this way, the attachment is rigidly supported by the vacuum manifold, and, by means of tube 47, is connected thereto by a vacuum-tight connection. The outlets on the vacuum manifold project upwardly at an angle, so that the gases and vapors, which pass upwardly through the tube 13, and then pass downwardly through the tube 47 into the outlet 48 and into the vacuum manifold, thus preventing the contamination of the material in the container by the contents of the manifold or its outlet.

In operation, the entire attachment is suitably wrapped and sterilized, a clamp being placed on the rubber tube at the top of the attachment, and on the tube between the stopper receptacle and the tube 4. The wrapping around the rubber tube at the top of the apparatus is removed, and the attachment fastened to the vacuum manifold, suitable precautions being taken to insure sterility. The rest of the wrapping is then removed, and, if a bell is provided at the lower end of the attachment, as in Fig. 9, the open end of the bell is immersed in antiseptic solution.

A container 1 having suitably frozen material 1a within it is attached as shown in Figs. 1 and 9, with sterile technique, the clamp on the connection to the vacuum manifold is removed and the vacuum is applied and the material desiccated or dehydrated. After the desiccation or dehydration is complete, the clamp is removed from the tube 18, a stopper 29 is introduced into tube 10 by means of the valve, and the clamp is replaced on the tube 18. The lower portion of the apparatus, including the container, is then pulled down to the position shown in Fig. 2, the extensible or flexible tube 13 permitting this. When the lower portion of the apparatus is pulled down, the tube 11, being rigidly connected to tube 12, no longer blocks the opening between sleeves 4 and 10, and permits the rubber stopper 29 to fall into position in the neck of the vial or container. As soon as the rubber stopper is in the proper position in the neck of the container, the lower portion of the attachment or apparatus is raised, as shown in Fig. 3, so that the plunger 11 extends down into the neck of vial or container and forces the rubber stopper into tight engagement with the tapered portion of the neck of the vial, thus insuring a tight seal which will retain the high vacuum in the vial for such short periods of time as are required during the sealing of the glass neck of the vial and during the restoration of the material to a liquid state.

After the rubber stopper has been forced into tight engagement with the neck of the vial while maintaining the vacuum therein, the rubber tube connecting the attachment to the vacuum manifold is clamped, and the clamp on the rubber tube 18, connecting the tube 24 and the tube 4 is removed, permitting air to enter the attachment through the air filter. In this way, the vacuum in the attachment is broken without the inside of the attachment being contaminated. The sealed vial, as in Fig. 4, is then removed, and the bell again immersed in antiseptic solution. This series of operations may then be repeated several times, and a number of containers may be so processed, with sterile technique, and without requiring that the attachment be sterilized each time a container is processed.

After the container is removed, a portion of the neck is heated by means of a broad flame and drawn to capillary dimensions and the neck again connected to a vacuum pump or manifold and sealed by means of a flame, as illustrated in Figs. 11 and 12. A final container such as shown in Fig. 5 with an all-glass seal is thus obtained. The neck of the vial is scratched or etched as shown at 30 in Fig. 5 to simplify breaking off the upper portion of the neck as shown in Fig. 6, when restoration is desired. The neck of the vial or container may be sealed before the container is removed from the apparatus, but preferably the sealing is accomplished afterward, as this simplifies the production of a proper seal, and avoids the difficulty encountered in sealing a relatively large tube made of ordinary soft glass under a high vacuum.

I have described the flame-sealing of the neck of the vial or container while the neck is connected to a vacuum, to insure the presence of a vacuum in the sealed neck between the rubber stopper and the glass seal, as this is a particularly advantageous method of sealing the containers, and is the method which I prefer to use. The container so produced, having a vacuum both in the container proper, and a vacuum in the neck between the rubber stopper and the glass seal is the form of container which I prefer and which is particularly advantageous. Nevertheless, my invention is not limited to the production of such containers, or such containers, as the glass seal may be made without connecting the neck to a vacuum, and without producing a vacuum within the neck, particularly with those containers in which the volume of the container is relatively large, and is many times as great as the volume of the neck, or that portion of the neck between the rubber stopper and the glass seal, without departing from the scope of my invention. When the neck is flame-sealed without first producing a vacuum within the neck, the air within is greatly attenuated by the heat required to seal the glass and is free from any appreciable amount of moisture so that there is but little air present above the rubber stopper to penetrate past the stopper into the container, and almost no moisture, so that, despite the fact that some air may enter the container, the amount which can enter is almost infinitesimal, so that the vacuum within the container, particularly where the container is relatively large, is not impaired to any great degree, and sufficient air to interfere with the proper solution of the material on the introduction of water cannot enter the container.

When it is desired to restore the material, it is simply necessary to break off the upper portion 31 of the neck, producing a container having a rubber stopper as shown in Fig. 6, and introduce the needle 32 of a hypodermic syringe through the rubber stopper as shown in Figs. 7 and 8, forcing water through the needle into the evacuated container. The rubber stoppers are advantageously provided with a passage 33 (Fig. 3) extending part way through them to facilitate the passage of the needle. After the proper amount of water has been forced into the container and the material within the container is dissolved, the needle is removed temporarily to admit air into the container so that the dissolved material can be removed, the needle of the hypodermic syringe is again inserted through the rubber stopper and the container and syringe turned upside down, as shown in Fig. 8 and the liquid material sucked into the hypodermic syringe, whereupon it is ready for injection.

During such times as no container is attached to the apparatus, a suitable clamp is placed on tube 17 to form a vacuum-tight connection to prevent breaking the vacuum within the vacuum manifold. A clamp is customarily used on rubber tube 18 to insure a vacuum-tight connection to prevent the leakage of air through stopper 25 and past valve 20 into tubes 10 and 4. This clamp is taken off to permit rubber stoppers to pass from the valve 20 down into the tube 10 at such times as are desired, and during such times, the valve 20 is sufficiently tight to prevent the ingress of much air, and if the attachment is used in conjunction with a manifold of suitable size, the amount of air which enters at the time of introduction of a stopper into the tube 10 is so small that there is almost no noticeable change in the pressure within the apparatus. This clamp may also be removed after a rubber stopper has been inserted in a container, and when it is desired to remove the container from the attachment, to permit breaking the vacuum in the container with sterile air suitably filtered. When this is done, care should be taken that the rubber tube connecting the attachment to the vacuum manifold is clamped. However, the clamp should not be left off of the rubber tube 18 for any longer period of time than is necessary.

It will be understood that the apparatus as described above is by way of illustration, and that many modifications and embodiments of the invention may occur to those skilled in the art which are within the scope of the present invention. For example, instead of providing a tube or cylinder containing a number of stoppers which may be used for the sealing of a number of containers, a suitable tube containing but one stopper, and hence not requiring a mechanism such as the valve 20 to introduce the stoppers into the tube 10 singly, may be used. The provision of a tube containing a number of stoppers is particularly advantageous, because it permits the continuous operation of the apparatus with a minimum of labor and a minimum of changing of connections, etc., and simplifies the introduction of a sterile stopper into each container. For example, a tube equipped with a suitable air filter may be supplied with some 7 or 8 or more stoppers, the entire tube and stoppers being sterilized in a suitable manner, as by steam sterilization or by baking, and connected to the apparatus by tube 23 with sterile precautions. With the air filter 27 provided, the sterility of the stoppers is assured, and a number of containers equal to the number of stoppers contained in the tube may be processed without the requirement of sterilizing a stopper and container therefor each time a container is processed.

In carrying out a desiccation process such as described, the period required to desiccate the material is fairly prolonged, and it is desirable to conduct the operation so that for each attachment one container may be processed per day. In order to accomplish this, it is necessary to have the actual processing time not more than 22 hours, leaving some 2 hours for sealing the containers and replacing them with new containers with frozen material in them. The process and apparatus of the present invention greatly speeds up the changing of containers and the sealing of the containers. In order to seal a container according to the process of the present invention, it is merely necessary to introduce a stopper into the neck of the container by allowing a stopper to pass from the valve 20 into the tube 10, pulling down the lower part of the apparatus so that the stopper falls into the proper position in the neck of the vial, and then to push up the lower part of the apparatus so that the plunger 11 forces the stopper into tight engagement with the neck of the vial. The container may then be removed from the apparatus, and a new container placed thereon, ready for processing. It is not necessary to flame-seal the neck of the container immediately, as during a short period of exposure the seal obtained by means of the rubber stopper is sufficient to hold the high vacuum within the container and to prevent ingress of moisture or any contamination.

While I have described the invention with particular reference to its application to the production and sealing of desiccated biologically active substances in a final container, it is not limited thereto; as in its broader aspects it includes the new process and apparatus as applied to the introduction of a perforable stopper into the neck of a container while maintaining a vacuum therein, and to the production of an evacuated container having an all-glass seal, and having a perforable closure sealed within it; the stopper being introduced and forced into place while a vacuum is maintained within the container. Nevertheless, the invention is of particular advantage for the production of desiccated biologically active substances in a sealed container provided with a glass seal, and with a perforable stopper sealed within it, such that the glass seal affords absolute assurance that the vacuum within the container is maintained and that the ingress of moisture or contaminating substances is prevented, and yet which is adapted for the introduction of water or liquid through the perforable stopper, after the glass seal is broken, without breaking the vacuum.

I claim:

1. The method of sealing desiccated biologically active substances in a final glass container which comprises introducing a perforable stopper into the neck of the container while maintaining a vacuum within the container, forcing said stopper into tight engagement with the neck of the container by gradually applied pressure, and flame sealing the neck of the container above the perforable stopper.

2. The method of sealing desiccated biologically active substances in a final glass container which comprises introducing a perforable stopper into the neck of the container while maintaining a vacuum within the container, and sealing the neck of the container above the perforable stopper while maintaining a vacuum in the neck above the perforable stopper.

3. The method of sealing desiccated biologically active substances in a final glass container which comprises introducing a perforable stopper into the neck of the container while maintaining a vacuum within the container, forcing said stopper into tight engagement therewith, and sealing the neck of the container above the perforable stopper while maintaining a vacuum in the neck above the perforable stopper.

4. Apparatus adapted for sealing substances in a final glass container comprising an extensible tube, a movable plunger within said tube, means for fastening a container to one end of said tube, and means including a branch from said tube adapted to be sealed with a vacuum tight seal and normally blocked by said plunger for introducing a perforable stopper within said tube and within the neck of the container.

5. Apparatus adapted for sealing substances in a final glass container comprising a tube having an extensible portion, a movable hollow plunger within said tube, means for connecting a container to one end of said tube, means for applying a vacuum to the other end of said tube, means, including a branch from said tube adapted to be sealed with a vacuum tight seal and normally blocked by said plunger, for introducing a stopper into said tube and into the neck of the container, whereby it may be forced into tight engagement with the neck of the container by the plunger while a vacuum is maintained in said container.

6. Apparatus adapted for sealing substances in a final glass container comprising a tube having an extensible portion, a hollow plunger, fixed with respect to one end of said tube and movable with respect to the other, within said tube, a branch from said tube normally blocked by said plunger, means for connecting a container to the end of the tube movable with respect to said plunger, means for introducing a perforable stopper into said branch, whereby, by moving the portion of the tube movable with respect to said plunger, the stopper may be introduced into said tube and thence into the neck of said container and whereby said stopper may be forced into tight engagement with the neck of the container by reversing the movement of the movable portion of the tube and causing said plunger to enter said neck and press against the stopper while a vacuum is maintained in said container.

7. A device for introducing stoppers into a tube comprising a receptacle adapted to receive a plurality of stoppers, and a valve connected thereto adapted to receive a single stopper, reverse it, and deliver it to said tube.

8. A device for introducing stoppers into a tube comprising a receptacle adapted to receive a plurality of stoppers, and a valve connected thereto adapted to receive a single stopper, reverse it, and deliver it to said tube, and means for introducing sterile air into said receptacle.

9. A device for introducing stoppers into an evacuated tube comprising a receptacle adapted to receive a plurality of stoppers, a valve attached thereto adapted to receive a single stopper, reverse it, and deliver it to said tube, and means for making a vacuum-tight seal between said valve and said tube.

10. The method of sealing a glass container which comprises introducing a perforable stopper into the neck of the container while maintaining a vacuum within the container, forcing said stopper into tight engagement with the neck of the container to form a vacuum tight seal, then breaking the vacuum in the neck of the container above the stopper, drawing a portion of the neck above the stopper to a relatively fine tube, re-evacuating the neck and flame-sealing it at the drawn portion while maintaining a vacuum therein, whereby both the container and the neck of the container above the stopper are maintained in an evacuated condition.

11. The method of sealing desiccated biologically active substances in a final glass container which comprises introducing a perforable stopper into the neck of the container while maintaining a vacuum within the container, and flame sealing the neck of the container above the perforable stopper.

COURTLAND H. BARR.